May 19, 1959

G. A. AKIN ET AL 2,887,271

MULTIPLE POINT PROPORTIONING CONTROLLER

Filed Sept. 1, 1954

George A. Akin
James W. Henry
INVENTORS

BY

ATTORNEYS

May 19, 1959

G. A. AKIN ET AL 2,887,271

MULTIPLE POINT PROPORTIONING CONTROLLER

Filed Sept. 1, 1954

George A. Akin
James W. Henry
INVENTORS

BY

ATTORNEYS

May 19, 1959 G. A. AKIN ET AL 2,887,271
MULTIPLE POINT PROPORTIONING CONTROLLER
Filed Sept. 1, 1954 5 Sheets-Sheet 3

Fig. 4

George A. Akin
James W. Henry
INVENTORS
BY
ATTORNEYS

May 19, 1959      G. A. AKIN ET AL      2,887,271
MULTIPLE POINT PROPORTIONING CONTROLLER
Filed Sept. 1, 1954      5 Sheets-Sheet 4

George A. Akin
James W. Henry
INVENTORS

BY

ATTORNEYS

May 19, 1959

G. A. AKIN ET AL 2,887,271

MULTIPLE POINT PROPORTIONING CONTROLLER

Filed Sept. 1, 1954

George A. Akin
James W. Henry
INVENTORS

BY

ATTORNEYS

United States Patent Office 2,887,271
Patented May 19, 1959

2,887,271

MULTIPLE POINT PROPORTIONING CONTROLLER

George A. Akin and James W. Henry, Kingsport, Tenn., assignors to Eastman Kodak Company, Rochester, N.Y., a corporation of New Jersey Application September 1, 1954, Serial No. 453,665

9 Claims. (Cl. 236—15)

This invention relates to the control of process variables and particularly to an electrical control for controlling several points of measurement wherein the variables are measured sequentially in a repeated time cycle and a controlled correction proportional to the difference between a desired and a measured value is instigated at the time of measurement of the variables.

Single point controllers are generally available from a number of manufacturers. These controllers are generally made for on-off control, proportional control, and proportional control with automatic reset or derivative action or both. For most industrial applications where close temperature control is desired, on-off control is unsatisfactory due to the cycling in temperature which results. Proportional control is satisfactory in many cases, and in cases of large load changing or variations in supply, proportional control with automatic reset may be desirable. While single point controls with proportioning action are generally available, insofar as we have been able to determine, no single instrument is available which will control a number of variables.

The primary object of the present invention is to provide a method and apparatus for controlling a plurality of variable conditions in which each condition is measured and compared with a predetermined value for that condition sequentially in repeated cycles, and a corrective control proportional to the difference of the compared values is applied to each condition at the time the measurement of the condition is made.

Another object of this invention is to provide a means of simply and economically controlling a number of variables by combining with commercially available multipoint instruments, which operate by measuring the points in sequence, a simple control system for controlling each of the variables.

And a further object is to combine a multi-point measuring apparatus with a simple device for controlling each of the measured variables in which the control of the variables is proportional in nature.

The features which we consider characteristic of our invention are set forth with particularity in the appended claims. The invention itself, however, both as to its construction and methods of operation, together with additional objects and advantages thereof, will best be understood from the following description when read in connection with the accompanying drawings in which:

The control system according to this invention consists of a number of electrical control circuits, equal in number to the number of variables to be controlled, each of which operates to provide the necessary control for one of the points to be controlled. For example, a method of controlling the temperature in furnaces, ovens, or other electrically heated devices is to regulate the percentage of the time that heat is applied to the unit by switching on and off the electrical power for short intervals in such a way that the percentage of time the power is applied is sufficient to provide the required heating. This type of control is sometimes called "duration adjusting type control." In the operation of the present control system the deviation of each variable condition from a predetermined value therefor is measured in sequence and applied to the corresponding control circuits in sequence. The control circuits then regulate the length of time power is applied to the heating elements in each controlled point to give the amount of heat required for the maintenance of the controlled temperatures. Thus the fraction of the time that heating is applied between temperature measurements of each point is regulated to maintain the desired temperatures. While we have specifically referred to the control of temperatures, this is by way of example only since the invention is equally applicable to controlling many other variable conditions, for example, the speed of rotation of a moving part, the liquid level of a processing vat, the flow of fluid through a conduit, the pressure of a fluid, etc.

Figure 1:
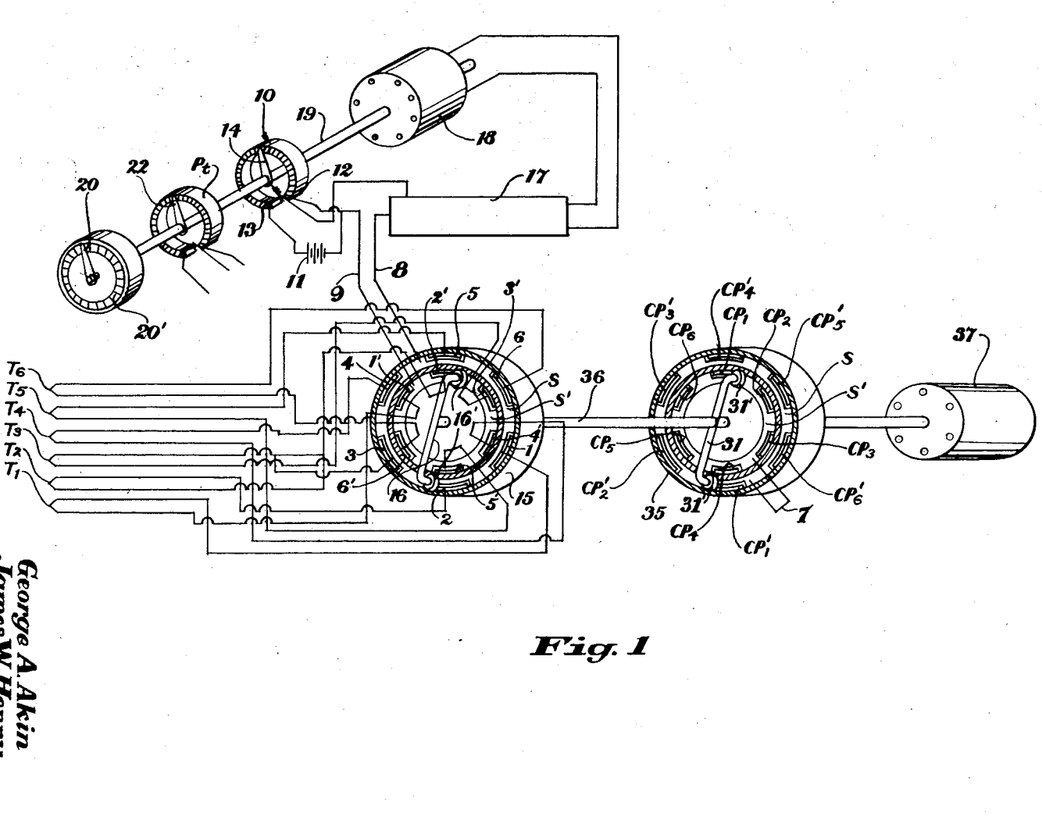
Fig. 1 is a wiring diagram of a conventional multipoint self-balancing potentiometer and showing schematically how a control system for the variable conditions measured thereby may be combined therewith in accordance with a preferred embodiment of the invention.
Figures 6, 7:
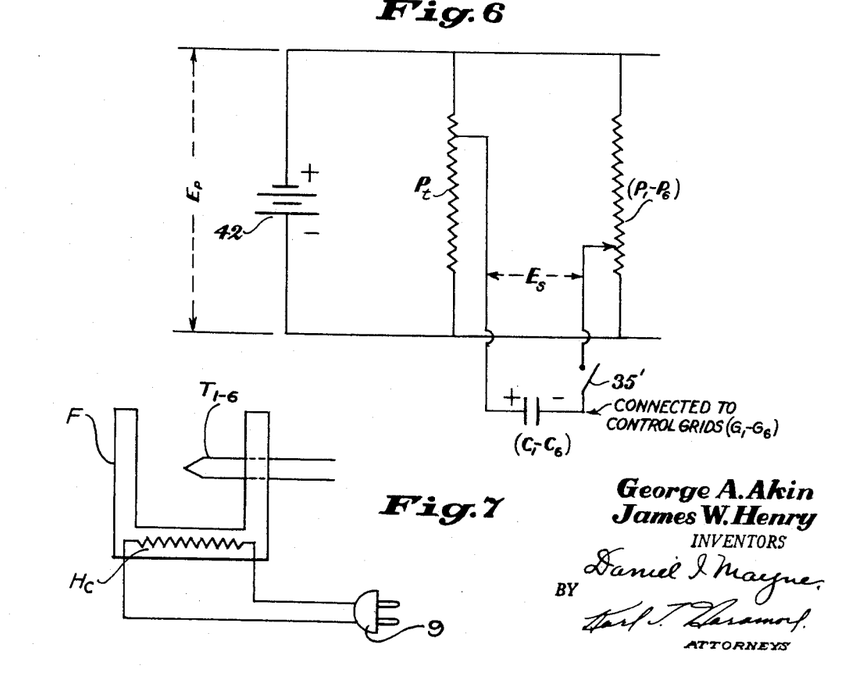
Fig. 6 is a simplified wiring diagram showing how the measured and predetermined values of a variable condition are connected in a bridge relation to obtain an output voltage which is proportional to their difference.
Fig. 7 is a schematic view showing how the heating unit of a furnace or other heater can be plugged into the control system to derive a corrective or restorative action therefrom.

Referring now to the drawings, Fig. 1 illustrates the functioning of a conventional multiple point indicating or recording potentiometer of the self-balancing type. The potentiometer 10 is excited by a direct current E.M.F. derived from a source of potential such as battery 11 which is applied to points 12 and 13 of the potentiometer slide wire. By means of a brush 14, any portion of the E.M.F. applied to the potentiometer slide wire may be derived from the slide wire with reference to either point 12 or point 13. For purposes of illustration the invention will be disclosed as used to control the temperature of six different furnaces whose individual temperatures are measured by six thermocouples $T_1$-$T_6$. As schematically shown in Fig. 7, each furnace F may be one of the type which is electrically heated by a heating coil $H_c$ connected to an electrical plug 9 adapted to be plugged into an outlet in a power supply. If the furnace is oil or steam heated, the power supply may control a motor operating a valve in the fuel line. Assuming the self-balancing potentiometer is used to control the temperature of six different furnaces, in Fig. 1 a thermocouple selector switch 15 is shown set to connect thermocouple $T_2$ into the measuring circuit, contact buttons 16' of the contactor arm 16 of the selector switch 15 connecting contacts 2 and 2' of the switch to the outer and inner segments S and S', respectively, of the switch to effect such connection through leads 8 and 9. The potential developed by thermocouple $T_2$ is arranged to be of opposite polarity to the potential derived from the potentiometer slide wire. The algebraic sum of these potentials is converted to a mechanical motion to position the brush 14 of the potentiometer 10 by means of an electro-mechanical or electric means indicated by box 17 which starts, stops, or reverses a balancing motor 18 which drives a shaft 19 to which the brush 14 of the potentiometer 10 is connected. If the potential developed by thermocouple $T_2$ is equal to the potential derived from the potentiometer slide wire, there is no difference in E.M.F. available to the balancing motor control mechanism so that the motor is not energized. If the potential developed by the thermocouple $T_2$ is greater than the potential derived from the potentiometer side wire, this difference in E.M.F. is applied to the control circuit of the reversible balancing motor 18 and causes the motor to rotate in a direction to reduce the discrepancy between the two potentials so that an electrical null is obtained. If the potential of the thermocouple $T_2$ is smaller than the derived potential of the potentiometer 10, the motor is again operated but in the counter direction to restore the electrical circuit to a null condition.

As can be seen, the motor 18 which drives the brush 14 of the potentiometer 10 in the measuring circuit also drives an indicating dial 20 which is fixed to the shaft 19 and whose scale 20' can be calibrated in any system which may be desired. Rather than merely having an indicating dial 20 for indicating the different temperatures as they are measured, it is common practice for multipoint self-balancing potentiometers of the type described to have continuous recording systems consisting of a pen which is moved across a continuously driven recording tape as is well known. In such instances the recording pen would be driven in much the same manner as the indicating dial 20 in the disclosed arrangement. In accordance with the present invention a potentiometer $P_t$ similar to the potentiometer 10, and hereinafter called the transmitter potentiometer, is connected to the shaft 19 to be driven in mechanical synchronism with the potentiometer 10 so that the brush 22 of the transmitter potentiometer $P_t$ will move synchronously in time and position with the brush 14 of potentiometer 10. As mentioned, this transmitter potentiometer $P_t$ is not a part of the self-balancing potentiometer but is used in accordance with the present invention to operate controller circuits which will be described later.

Figure 2:
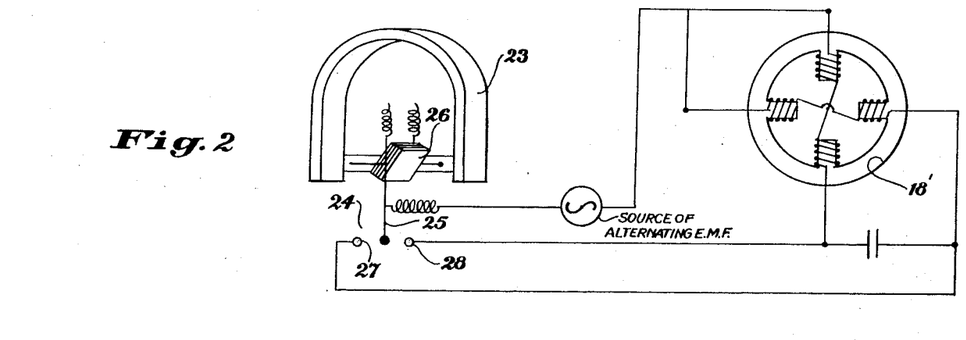
Fig. 2 is a wiring diagram of a typical electromechanical means which can be used in the self-balancing potentiometer for controlling the balancing motor.

There are several known electrical systems for controlling a reversible motor from a weak E.M.F. as is necessary in the self-balancing potentiometer. One suitable system is shown in Fig. 2 as comprising a moving coil galvanometer 23 which is used to provide the sense of rotation to control the reversible balancing motor 18. A two-phase reversible motor 18', corresponding to the reversible motor 18 shown in Fig. 1, is connected to a switch 24 formed by a movable contact 25 attached to the moving coil 26 of the galvanometer and acting against two stationary contacts 27 and 28. These contacts are so arranged that a null position of the switch may be obtained when the moving coil galvanometer has no signal applied to its coil; i.e., the switch contact 25 does not contact either stationary contact. When one side of the switch formed by the moving coil galvanometer and the stationary contacts is closed, the reversible motor 18' and the brush 14 of the potentiometer 10 connected with the shaft thereof rotates in a clockwise direction. When the reverse situation exists, the motor operates in a counter-clockwise direction. By mechanically linking the balancing motor and the movable brush 14 of the potentiometer 10, as by means of shaft 19, so that the motor can position the brush on the potentiometer, and arranging the contacts and associated wiring of the switch and motor to cause the motor to rotate in a direction such that the brush of the potentiometer is adjusted to a null position, a self-balancing potentiometer can be constructed.

Figure 3:
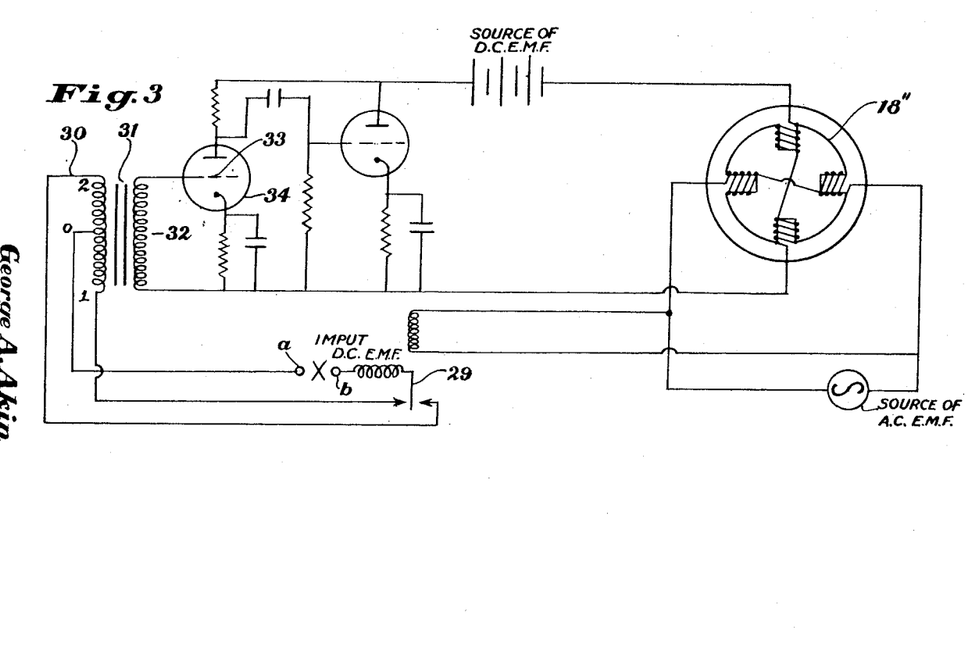
Fig. 3 is a wiring diagram of a typical electronic means for controlling the balancing motor of the self-balancing potentiometer.

There is shown in Fig. 3 a prototype electronic circuit which is capable of controlling a reversible alternating current motor from a weak E.M.F. such as that derived from a self-balancing potentiometer. In this electrically controlled circuit the potential difference signal is applied at points $a$ and $b$ of the input system. By means of a vibrating switch 29 driven in synchronism with the alternating current mains supplying one phase of a two-phase balancing motor 18'', the direct current signal is applied alternately to two halves of the primary coil 30 of transformer 31. When the vibrating switch 29 is closed in one direction, current flows from point 1 to point 0 of the coil. When the switch is closed in the opposite direction, current flows from point 2 to point 0 from the coil. If the polarity of the D.C. E.M.F. applied to the points $a$ and $b$ is reversed, current would then flow from point 0 to point 1 in one case and from point 0 to point 2 in the second case. In both cases since the contacts are made and broken at the line frequency of the A.C. mains, the magneto motive force developed by the primary coil of the transformer is reversed at the rate of the line frequency. Since this magneto motive force also is reversed in phase by reversal of the polarity of the D.C. signal applied at points $a$ and $b$, the alternating voltage developed in the secondary coil 32 of the transformer 31 can be reversed in phase by 180° by reversing the polarity of the D.C. input voltage applied in points $a$ and $b$. The alternating E.M.F. obtained from the secondary coil of the transformer 31 is applied to the control grid 33 of the input vacuum tube 34 of a thermionic amplifier. This amplifier has as its final load one phase of a two phase alternating current motor 18''. The other phase of the motor is supplied directly from the A.C. mains. By means of suitable circuit component adjustment, phase shift of 90° is obtained in the thermionic amplifier in the input signal to the vibrating switch 29 and the coil of the two-phase motor driven by the amplifier. The 90° phase shift sets up the proper two-phase operating conditions for the motor. Since the amplifier excited phase can be reversed, this amounts to reversing the leads on one phase of the motor which reverses the direction of rotation of the two-phase motor. The electronic amplifier, motor, and associated circuits, can be arranged mechanically and electrically to restore automatically any unbalance of the potentiometer measuring circuit to a null condition, thus effecting the same result as the electro-mechanical arrangement shown in Fig. 2.

Fig. 1 also shows a second selector switch 35 which we shall refer to as the controller set point selector switch and which is connected to the shaft 36 of a timing motor 37 which drives the thermocouple selector switch 15. This second controller set point selector switch 35 is not related to the multi-point self-balancing potentiometer but is used to control electric circuits in the control system in accordance with the present invention. From the structural standpoint the controller set point selector switch 35 differs from the thermocouple selector switch 15, in that it has its inner and outer segments S' and S tied together electrically, as is well known and as is indicated by wire 7 in Fig. 1, and its contacts $CP_1$–$CP_6$ successively connected in circuit with its contacts $CP'_1$–$CP'_6$ by means of contact buttons 31' of a rotating contactor 31 fixed to the shaft 36 which successively connects the contacts $CP'_1$–$CP'_6$ to the outer segment S and the inner segment S' to corresponding contacts $CP_1$–$CP_6$.

This invention consists of a control system which, when used in combination with a multiple point measuring instrument of the self-balancing type, as described above, produces periodic control signals for each point measured by the self-balancing potentiometer. Each control signal is associated with only one of the points or conditions being measured by the multi-point potentiometer, and is initiated at the time the measurement of its associated point or condition occurs. The duration of each control signal is established by the control system each time the associated condition or point is measured by the self-balancing potentiometer in such a way that the variable condition being measured by its associated control point is maintained at a relatively constant value which can be set as desired by the user within the range of operation of the measuring instrument. An explanation of the control system will now be given.

Figure 4:
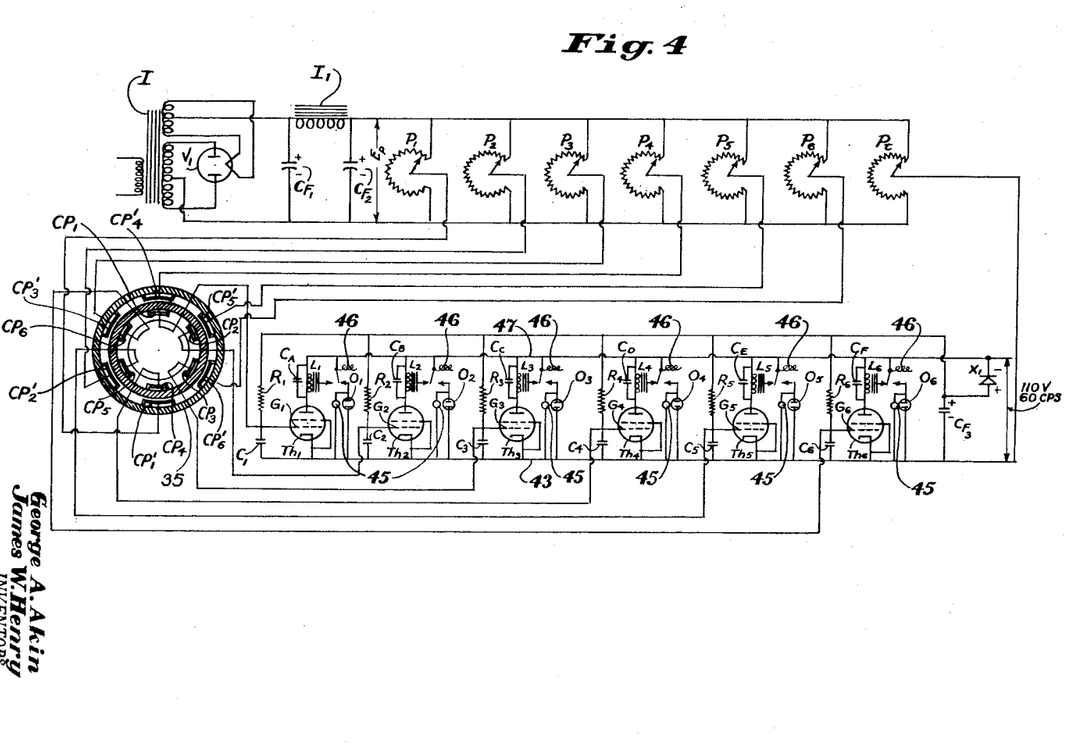
Fig. 4 is a wiring diagram of a control system constructed in accordance with a preferred embodiment of the present invention, and which is adapted to be combined with a conventional multi-point self-balancing potentiometer such as shown in Fig. 1.

Fig. 4 illustrates an electrical circuit of a six-point multiple point control system which is capable of giving proportional duration on-off control to six separate heating units when combined with a multiple point self-balancing measuring instrument such as described above. This controller system functions as follows:

The set point potentiometers $P_1$–$P_6$ are excited from the power supply $E_p$ as is the transmitter potentiometer $P_t$ which is mechanically synchronized with the self-balancing potentiometer 10. Each of the set point potentiometers corresponds to one of the conditions to be controlled and can be manually set to give a predetermined or standard value for its condition. By means of the controller set point selector switch 35 the brushes of these six potentiometers $P_1$–$P_6$ are successively switched onto and off of the control grids $G_1$–$G_6$ of thyratron tubes $Th_1$–$Th_6$. The switch 35 is arranged so that set point potentiometer $P_1$ will be connected to the control grid $G_1$ of tube $Th_1$ for an instant (approximately 4 seconds) then disconnected. The $P_2$ potentiometer will then be connected to the control grid of tube $Th_2$, $P_3$ to the control grid of $Th_3$, etc., in a time cycle determined by the timing motor 37 of the measuring potentiometer. These connections are, therefore, synchronized with measurements of the corresponding or associated points by the self-balancing potentiometer.

The condensers $C_1$–$C_6$ are arranged so that any difference of potential arising from a difference in setting of the set point potentiometer for a given point as referred to the transmitter potentiometer $P_t$, while that point is being measured, will result in a charge which is stored on the associated condenser.

The thyratron tube of each control circuit is arranged to apply power to the control system when the tube is blocked by a negative charge or bias on the control grid of the tube. Since this negative charge is obtained from the discrepancy in settings of the set point potentiometers $P_1$–$P_6$ and the transmitter potentiometer $P_t$, the magnitude of the blocking voltage and the charge on the associated condenser are determined by the difference between the set point potentiometer setting and the transmitter potentiometer brush position. The simplified wiring diagram of Fig. 6 shows how the transmitter potentiometer $P_t$ and each of the set point potentiometers $P_1$–$P_6$ are selectively connected in bridge relation by operation of controller set point selector switch 35 so as to apply the appropriate charge to the storage condensers $C_1$ to $C_6$ of each control circuit, such application of charge to the capacitors being carried out in a predetermined cycle by operation of the selector switch 35 so that the controlling charge for each point is applied at the same time as the separate temperatures are being measured. In the diagram of Fig. 6 the full wave power supply for the potentiometer network has been replaced by a battery 42 and only a single switch 35' has been indicated for connecting the set point potentiometer ($P_1$–$P_6$) in bridge relation with the transmitter potentiometer $P_t$, said switch constituting one switch point of the selector switch 35.

If approximately linear discharge of the capacitor in any one of the six control circuits is provided for, then power will be applied for the length of time the tube is blocked, and the length of time will be determined by the magnitude of the blocking voltage created by the charge on the condenser and the rate at which this condenser is discharged.

A positive bleed-down voltage supplied by the rectifier $X_1$ and the filter capacitor $CF_3$ is applied to the control grid of tube $Th_1$, and all the other thyratron tubes $Th_2$–$Th_6$, through a resistor $R_1$, or $R_2$–$R_6$ as the case may be depending upon which control circuit is being considered. The other side of this power supply is referred to the cathode of each of the thyratron tubes by means of a cathode bus 43. The time constant of $R_1$ and $C_1$, as in the case of the first control circuit, is made long enough so that when $C_1$ is charged to the maximum voltage allowed before entering the proportioning control band; i.e., the point where controlling action of the on-off control begins to take place, the capacitor $C_1$ will contain sufficient charge to force the control grid of tube $Th_1$ negative for the entire time cycle of the selector switch 15 of the associated measuring instrument. After entering the control band, the time constant formed by the $R_1$ and $C_1$ timing network is sufficiently short so that the condenser bleed-down from the maximum voltage at entering the control point is short enough to fire the thyratron before the cycle of the controller set point selector switch 35 is complete. As the charge on condenser $C_1$ is made less, caused by approach to the control point by the brush on the transmitter potentiometer $P_t$, the bleed-down time required to fire the thyratron becomes less and less, since less charge must be dissipated from the capacitor $C_1$ during the control cycle. The capacitor-resistor combination $R_1$—$C_1$ has a fixed time constant. In normal operation the potential existing due to unbalance of set point potentiometer $P_1$ and transmitter potentiometer $P_t$ applies a negative potential to the control grid of thyratron $Th_1$ as will be clearly understood from an inspection of Fig. 6. On occasion due to overshoot of the control point by transmitter potentiometer $P_t$, a positive voltage could be applied to the thyratron tubes of the individual control circuits. This in no manner would cause false operation since the positive charge applied to capacitor $C_1$, or $C_2$–$C_6$ as the case may be, would be dissipated immediately by rectifier action between the control grid of the associated thyratron tube and the cathode thereof, and the tube would continue to fire causing the relay $L_1$, or $L_2$–$L_6$, to be pulled in and thereby prevent power being applied to the control outlet $O_1$, or $O_2$–$O_6$, and the pilot light 45 connected in parallel therewith. As should be obvious, the plug 9 of the heating coil of the furnace, see Fig. 7, will be plugged into these power outlets $O_1$–$O_6$. As indicated in Fig. 4, each of the relays $L_1$–$L_6$ connected in the plate circuits of the thyratron tubes $Th_1$–$Th_6$ is normally operated by spring 46 in a direction to connect the power control outlets into a power supply consisting of leads 43 and 47 which are in turn connected to a 110-volt 60 c.p.s. supply. In parallel with each of the relays $L_1$–$L_6$ is a capacitor $C_A$–$C_F$ whose purpose is to act as a filter to prevent chattering of the relays which are of the D.C. type.

The controller set point selector switch 35 successively selects points 1, 2, 3, 4, 5, 6, and in each case the time constant formed by the capacitor resistance combination applied to the grid of the thyratron tube is made long enough so that the appropriate proportioning band may be maintained constantly with the period of the controller set point selector switch cycle.

The thyratron tubes are operating in a self-rectified condition. As was pointed out above, condenser $C_A$ acts as a filter condenser to prevent chatter of relay $L_1$ due to the half-wave rectified current supplied by the grid controlled thyratron $Th_1$. The function of the power supply formed by rectifier $X_1$ and capacitor $CF_3$ should be self-evident.

The power supply formed by transformer I, diode $V_1$, capacitors $CF_1$ and $CF_2$ along with the filter choke $I_1$ is a conventional filtered full wave rectifier circuit. It is necessary that the transformer I be utilized inasmuch as there must be no direct current reference between the ends of the Wheatstone bridge formed by set point potentiometers $P_1$–$P_6$ and transmitter potentiometer $P_t$ and the cathode bus 43 of thyratron tubes $Th_1$–$Th_6$. For this reason the insulation resistance to ground of transformer I, and, of course, to the primary secondary windings, must be very good (in the order of 200–500 megohms).

The resistances of the set point potentiometers $P_1$–$P_6$ and transmitter potentiometer $P_t$ are in the order of $10^3$ ohm. The resistance of $R_1$ and the other bleed-down resistance $R_2$–$R_6$ are in the order of $10^7$ or $10^8$ ohms. It is because of this high bleed-down resistance that excellent insulation must be applied to any circuits referring to the grid of the thyratron tubes. The magnitudes of the storage capacitors $C_1$–$C_6$ should be in the order of 2 microfarads. Larger or smaller capacitors may be used depending upon the cycle of the controller set point selector switch 35 and good engineering practice as referred to the bleed-down resistor insulation. The thyratron tubes should be of the gas-filled type rather than mercury type since these tubes exhibit slightly better performance as referred to temperature.

The control system shown in Fig. 2 represents only one of several electronic methods which might be employed to obtain proportional on-off control as dictated by a Wheatstone bridge where one section of the bridge's two arms is driven by the indicator of a measuring instrument of some type and the remaining arm acts as an electrical set point. It is not necessary that thyratron tubes be used except for reasons of economy. Hard vacuum tubes might be employed using either pentodes operating in a range wherein the control grid can be overridden by the screen grid, thus providing a trigger action of the tube. Likewise dual triodes enclosed in one envelope might be employed to operate in the time-honored flip-flop circuit which will also provide the necessary trigger action when a certain potential on the control grid is reached. Hard vacuum tube circuits, however, are somewhat more expensive to apply since they require a direct current power supply and considerably more resistance components to attain the flip-flop or trigger action which is inherent in the tube. In some instances, hard vacuum tubes might prove advantageous since the threshold or trigger point of such circuits generally remains somewhat more stable than that of the thyratron tube.

Figure 5:
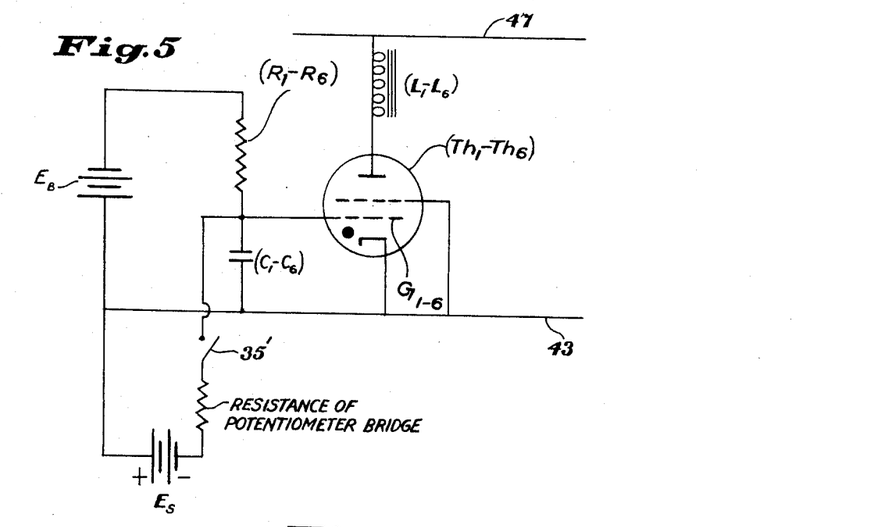
Fig. 5 is a simplified wiring diagram of a part of the control system and showing how the resistance-capacitance timing network is connected to the grid of the thyratron tubes in order to prevent blocking of the tube due to self-rectification.

The use of the capacitor for storing the information which is applied to the control tube by means of the controller set point selector switch 35 is considered to be a unique application. Generally speaking, circuits where the control grid of a tube is referred to the cathode of the tube are unsuccessful in their operation due to self-rectification of the tube where the control grid acts as a plate, and, of course, the cathode acts as a cathode due to pick-up and Johnson noise which charge the capacitor in the negative direction causing the tube to cut off. This undesirable phenomenon is circumvented in the present control system by the application of direct current of a positive value through the resistor used for bleed-down from the positive power supply. This circuit relationship is more clearly shown in Fig. 5 where the positive power supply provided by the rectifier $X_1$ and capacitor $CF_3$ is replaced by a battery $E_B$ which applies a positive potential to the high resistance $R_1$ through which the charge or storage capacitor $C_1$–$C_6$ must discharge. The switch 35' in Fig. 5 is one of the contact points on the selector switch 35 which apply the voltage $E_S$ to the capacitor at periodic intervals. The voltage $E_S$ indicated by a battery in Fig. 5 is in reality a potential difference derived from the Wheatstone bridge including set points potentiometers $P_1$–$P_6$ and transmitter potentiometer $P_t$. If, instead of the positive power supply which bleeds down the storage condenser, the bleed-down resistor was referred to the control grid and the cathode; i.e., in shunt across the storage condenser, this circuit would prove to be unsuccessful and unreliable because of self-rectification in the tube. It is possible that by careful shielding of the circuit and careful selection of tubes that the positive voltage power supply used for bleed-down of the storage capacitor could be eliminated. However, the economics of the situation would appear to dictate otherwise.

The use of a controller set point selector switch 35 to determine the cycle time of the entire controller system while at the same time selecting successive points is deemed to be novel. It is our claim that the capacitor and resistor combination combined with the positive voltage power supply to bleed-down the capacitor charge stored up by application by means of the selector switch of potential existing because of unbalance between the set point potentiometers and the transmitter potentiometer is also unique. Timing circuits utilizing the discharge or charge of a capacitor to establish a given period of time are admittedly quite common. However, the combination of a timing circuit of the electronic type embodying storage action with a timing element of a mechanical type to produce proportioning action for multiple point application has never, as far as can be determined, been applied to the control of temperatures or other variable conditions.

A further claim is made that because of the use of the positive voltage bleed-down applied through the bleed-down resistors to the capacitors used for storage of the signal, it is unnecessary that the voltage supply used to excite the bridge circuits formed by the set point potentiometers and the transmitter potentiometer be of a regulated nature. This is true since both direct current voltages are derived from the same unregulated A.C. mains. If the A.C. main voltage should rise, then the D.C. voltage also rises which excites the bridges formed by the potentiometers used for setting the controlling points and the transmitter potentiometer. The voltage also rises which is used to discharge the capacitor which stores the unbalance signal. The two voltages are, therefore, applied in the direction to nullify the need for regulation either of the A.C. mains or of the direct current voltage.

While we have described our control system as a means for controlling temperatures, it is pointed out that our control system is not limited to such a use but could also be applied for the control of any variable condition so long as the condition is susceptible of being detected by a variable voltage.

Figures 8, 9, 10:
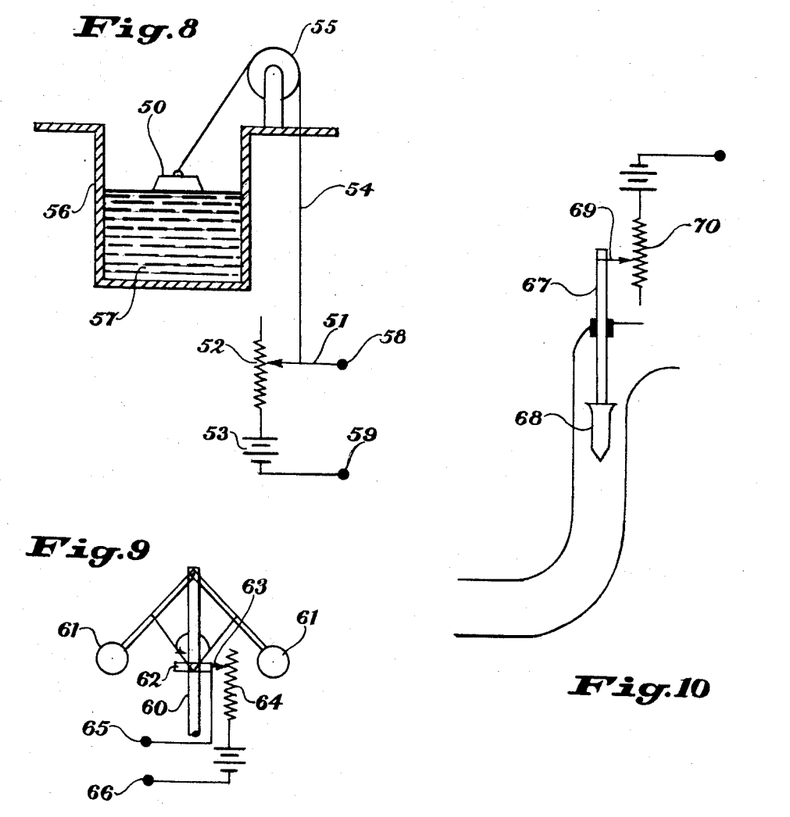
Figs. 8–11 show how other variable conditions can be measured and controlled by use of the present invention.

In Fig. 8 we have shown how our system could be used for controlling the level of a liquid in a reservoir. In this case a float 50 is connected to the brush 51 of a potentiometer 52 connected to a power supply 53 by a cord 54 passing over a pulley 55 supported on the edge of a tank 56 containing a fluid 57 whose level is to be controlled. As the liquid level varies, the float moves up and down to adjust the brush 51 on the potentiometer 52 and the output from points 58 and 59 of the potentiometer circuit could be compared with the output of a set point potentiometer in precisely the same manner as transmitter potentiometer $P_t$ is compared with set point potentiometers $P_1$–$P_6$ in the described arrangement. Any unbalance between these two voltages would then be transmitted to the appropriate control circuit such as shown in Fig. 4 whereupon the unbalanced condition would trigger one of the thyratrons causing the power control outlet O to be energized for a time proportional to the biasing signal. Then if a motor driven pump for filling the tank 56 were plugged into this power control outlet O, then the pump would be turned on to fill the tank and correct for any drop in liquid level which was detected.

In Fig. 9 we have shown how the speed of rotation of a shaft can be electrically detected and controlled by our system. In this instance the shaft 60 rotates in the direction indicated by the arrow and as the speed of rotation of the shaft varies, the weights 61 of the governor move outwardly by different amounts depending upon centrifugal action so that the position of the sliding collar 62 on the shaft changes with the speed of the shaft. Now if the brush 63 of a potentiometer 64 is connected with this collar 62, a signal voltage will appear at points 65 and 66 of the potentiometer circuit which will be indicative of the speed of the shaft. By balancing this voltage against a standard voltage indicating a desired speed of rotation for the shaft, any unbalance between the two can be applied to our control circuits so as to correct for an undesirable change in the speed of shaft rotation.

Figure 11:
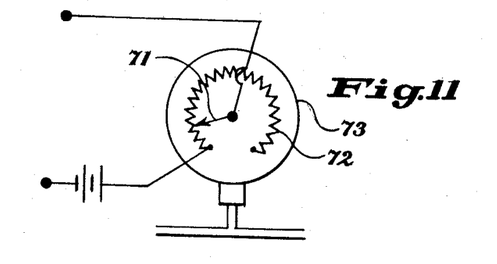

In Fig. 10 we have diagrammatically illustrated how the rate of flow of a fluid through a conduit might be electrically detected so that our present control system might be applied to control the rate of flow of the fluid. Here the rod 67 of a float 68 carries the brush 69 of a potentiometer 70. In Fig. 11 we have diagrammatically illustrated how a change in pressure could be electrically detected so that our present control system could be used to control the pressure in a line and maintain it at a given value. In this case the brush 71 of a potentiometer 72 is connected to the dial of a pressure gauge 73 so that said brush will move over the potentiometer in correspondence with the dial of the gauge and thereby create an electrical voltage representative of the pressure measured by the gauge.

While we have shown and described certain embodiments of our invention, we are fully aware of any modifications thereof that are possible. Our invention, therefore, is not to be limited to the precise details of construction shown and described, but is intended to cover all modifications coming within the scope of the appended claims.

Having thus described our invention, what we claim as new and desire to secure by Letters Patent of the United States is:

1. In a system for controlling a plurality of individual variable conditions the combination with a multipoint self-balancing potentiometer adapted to measure each of these variables successively in a repeated time cycle; of a control system for individually correcting each variable for any deviation from a predetermined value comprising means for altering each condition and including a power supply circuit; individual control means for completing each of said power supply circuits when there is a difference between the measured condition and the predetermined value of said condition and holding the circuit closed for a time proportional to such difference; said means including a switch in each of said power supply circuits, a separate electronic triggering circuit for operating each switch when a bias voltage is impressed on said triggering circuit; a resistance-capacitance timing network connected to the input of said triggering circuit; means for successively comparing the measured value of each condition with a predetermined value for that condition and generating a voltage corresponding to any difference between the two and applying this voltage as bias to the triggering circuit corresponding to the condition being measured; said last-mentioned means synchronized with the time cycle of said self-balancing potentiometer whereby the control setting of each control means is fixed at the time of measurement of the condition corresponding thereto.

2. A system for controlling a plurality of individual variable conditions according to claim 1 characterized by the fact that the time constant of said resistance-capacitance network is adjusted so that regardless of the size of the voltage impressed on said capacitance it will be dissipated before the time cycle of the self-balancing potentiometer is completed and a given variable is remeasured whereby each control means is reset at each successive measurement of the variable condition corresponding thereto.

3. In a system for controlling a plurality of individual variable conditions the combination with a multipoint self-balancing potentiometer adapted to measure each of these variables successively in a repeated time cycle; of a control system for correcting each variable for any deviation from a predetermined value comprising means for altering each condition and including a power supply circuit; control means for completing said power supply circuits when there is a difference between the measured condition and the predetermined value of said condition and holding the circuit closed for a time proportional to such difference; said means comprising an electronic control circuit for each condition and including an electron tube including a control grid; and a condenser connected in circuit therewith to place a bias on said grid when charged; means for comparing the measured value of each condition with a predetermined value for that condition and generating an E.M.F corresponding to any difference between the two and applying this E.M.F to the grid of the corresponding electron tube whereby the tube is triggered and the condenser is charged to hold it in this condition for a predetermined time; said last-mentioned means synchronized with time cycle of the self-balancing potentiometer whereby the control setting of each control means is fixed at the time of measurement of the condition and is reset at each successive measurement of that condition.

4. In a system for measuring and controlling a plurality of variable conditions the combination with a self-balancing potentiometer including an adjustable slide wire; individual means for producing an E.M.F which varies in amplitude and direction in accordance with the magnitude of the condition to be controlled; a selector switch for cyclically connecting each of said E.M.F producing means in circuit with the slide wire of said potentiometer to measure the magnitude thereof individually; of a control system for maintaining each of said variable conditions at a predetermined value comprising a potentiometer for each of said variable conditions adapted to be set at a predetermined value, a driven potentiometer mechanically linked to the slide wire of the self-balancing potentiometer to be adjusted in correspondence therewith; separate power control circuits for correcting each of said variable conditions, individual electronically controlled means for opening each of said circuits and including an electron tube having a control grid, and a relay connected in the plate circuit thereof; a second selector switch for selectively connecting each of said potentiometers in bridge relation with said driven potentiometer and applying the output of the bridge to the control grid of the electron tube controlling the power control circuit for the variable condition being measured.

5. In a system for controlling a plurality of variable conditions the combination with a multipoint self-balancing potentiometer adapted to successively measure each of these variable conditions in repeated time cycles of a given duration; of a control system for correcting each variable condition for any deviation from a predetermined value comprising means for altering each condition in a sense to reduce any difference between the measured and predetermined values and including a power supply circuit; individual control means for completing the different one of said power supply circuits when there is a difference between the measured condition and the predetermined value of said condition and holding the circuit closed for a time proportional to such difference; said means including an electronic switch having a control electrode which is triggered when a bias voltage is applied to said electrode; a resistance-capacitance timing network connected to said control electrode; means for successively comparing the measured value of each condition with a predetermined value for that condition and generating a voltage corresponding to any difference between the two and applying the voltage as a bias on the control electrode of the electronic switch corresponding to the condition being measured; said last-mentioned means mechanically connected to the cycling means of said self-balancing potentiometer to be cycled in synchronism therewith whereby the control setting of each control means is fixed at the time of measurement of the condition corresponding thereto.

6. In a system for controlling a plurality of variable conditions the combination with a multipoint self-balancing potentiometer adapted to successively measure each of these variable conditions in repeated time cycles of a given duration; of a control system for correcting each variable condition for any deviation from a predetermined value comprising means for altering each condition in a sense to reduce any difference between the measured and predetermined values and including a power supply circuit; individual control means for completing the different ones of said power supply circuits when there is a difference between the measured condition and the predetermined value of said condition and holding the circuit closed for a time proportional to such difference; said means including an electronic switch including an anode, a cathode and a control grid and which is triggered when a negative bias voltage is applied to said control grid; a resistance-condenser timing network in circuit with said control grid and including a static condenser referring the control electrode to the cathode; means for preventing blocking of electronic switch due to self-rectification between the grid and cathode which would charge the condenser to a negative value; said means consisting of a source of direct current voltage having a polarity such that the cathode is referred to the negative side of said voltage and the positive side is referred to the control grid through the resistance forming a part of the resistance-condenser timing network; means for successively comparing the measured value of each condition with a predetermined value for that condition and generating a voltage corresponding to any difference between the two and applying this voltage as a negative bias on the control grid of the electronic switch corresponding to the condition being measured; said last-mentioned means mechanically connected to the cycling means of said self-balancing potentiometer to be cycled in synchronism therewith whereby the control setting of each control means is fixed at the time of measurement of the condition corresponding thereto.

7. In a system for controlling a plurality of variable conditions the combination with a multipoint self-balancing potentiometer adapted to successively measure each of these variable conditions in a repeated time cycle of a given duration and including a potentiometer, a balancing motor for driving said potentiometer, a selector switch for cyclically connecting a voltage representing each condition in bridge relation with said potentiometer and a timing motor for driving said switch; of a control system for correcting each variable condition for any deviation from a predetermined value comprising means for restoring each condition in a sense to reduce any difference between the measured and predetermined values and including a power supply circuit for each restoring means; individual control means for completing the different ones of said power supply circuits when there is a difference between the measured condition and the predetermined value of said condition and holding the power circuit closed for a time proportional to said difference; said means including an electronic switch having a control grid which is triggered when a bias voltage is applied to said electrode; a resistance-capacitance timing network connected to said control grid; means for successively comparing the measured value of each condition with a predetermined value for that condition and generating a voltage corresponding to any difference between the two and applying this voltage as a bias on the control grid of the electronic switch corresponding to the condition being measured, and including a transmitting potentiometer mechanically synchronized with the self-balancing potentiometer; a reference potentiometer for each of said variable conditions which can be preset to a predetermined value; a second selector switch mechanically synchronized with the selector switch of said self-balancing potentiometer for cyclically connecting different ones of said reference potentiometers in bridge relation with said transmitting potentiometer and applying the output of said bridge to the control grid of the corresponding electronic switch as the different conditions are successively measured.

8. In a system for controlling the temperatures of a plurality of heaters the combination with a thermocouple in each heater; a multipoint self-balancing potentiometer adapted to successively measure each of these temperatures in a repeated time cycle and including a motor driven selector switch for selectively connecting said thermocouples into the circuit of said potentiometer for measurement of the temperatures; of a control system for correcting each temperature for any deviation from a predetermined value comprising means for applying heat to each heater and including a power supply outlet for each heater; individual control means for each heater adapted to connect the same individually to its corresponding power supply outlet, when there is a difference between the measured temperature and a predetermined temperature and holding the heater connected to its power supply outlet for a time proportional to such difference; said means including a thyratron tube adapted to be triggered when a negative bias is applied to the control grid thereof; a relay in the plate circuit of said tube controlling energization of said power supply outlet; a preset potentiometer for each heater establishing the predetermined temperatures thereof; a transmitter potentiometer mechanically synchronized with said self-balanced potentiometer; a second selector switch synchronized with the selector switch of said self-balancing potentiometer for cyclically connecting each of said preset potentiometers and said transmitter potentiometer in bridge relation and applying the output of said bridge as a negative bias to the control grid of the thyratron tubes of the individual control means; a resistance-capacitance timing network connected in circuit with the control grid of each tube to maintain the tube in a triggered condition for a time proportional to the bias placed thereon whereby the time restoring action applied to any heater is proportional to the deviation of its temperature from a predetermined value and which applied to the control means at the time the particular temperature is being measured may continue while successive temperatures are being measured.

9. A system for controlling the temperatures of a plurality of heaters according to claim 8 characterized by the fact that the capacitor of the resistance-capacitance timing network refers the control grid of the thyratron to its cathode; and including means for preventing blocking of the tube due to self-rectification between the grid and cathode which would charge the capacitor to a negative value, said means consisting of a source of direct current voltage having a polarity such that the cathode is referred to the negative side of said voltage and the positive side is referred to the control grid of the thyratron through said resistance having in combination with the capacitor a desired timing constant.

(References on following page)

References Cited in the file of this patent

UNITED STATES PATENTS

| | | |
|---|---|---|
| 1,296,250 | Wyss | Mar. 4, 1919 |
| 1,898,124 | Harrison | Feb. 21, 1933 |
| 1,910,340 | Johnson | May 23, 1933 |
| 2,106,030 | Junkins | Jan. 18, 1938 |
| 2,154,375 | Chambers | Apr. 11, 1939 |
| 2,249,682 | Clark | July 15, 1941 |
| 2,436,720 | Jones | Feb. 24, 1948 |
| 2,439,711 | Bovey | Apr. 13, 1948 |
| 2,689,088 | Hornfeck | Sept. 14, 1954 |
| 2,793,813 | Belcher | May 28, 1957 |
| 2,797,291 | Davis | June 25, 1957 |